United States Patent
Ashwood-Smith et al.

(10) Patent No.: US 10,404,608 B2
(45) Date of Patent: Sep. 3, 2019

(54) SYSTEMS, DEVICES, AND METHODS FOR LOW-JITTER COMMUNICATION OVER A PACKET-SWITCHED NETWORK

(71) Applicant: HUAWEI TECHNOLOGIES CO., LTD., Shenzhen (CN)

(72) Inventors: Peter Ashwood-Smith, Gatineau (CA); William McCormick, Ottawa (CA); Tao Wan, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/824,608

(22) Filed: Aug. 12, 2015

(65) Prior Publication Data
US 2016/0127246 A1    May 5, 2016

Related U.S. Application Data

(60) Provisional application No. 62/130,901, filed on Mar. 10, 2015, provisional application No. 62/073,132, filed on Oct. 31, 2014.

(51) Int. Cl.
*H04L 12/841* (2013.01)
*H04W 56/00* (2009.01)
(Continued)

(52) U.S. Cl.
CPC .......... *H04L 47/283* (2013.01); *H04L 43/062* (2013.01); *H04L 43/0852* (2013.01);
(Continued)

(58) Field of Classification Search
CPC ..... H04W 24/02; H04W 4/00; H04W 72/085; H04W 88/16; H04W 24/00;
(Continued)

(56) References Cited

U.S. PATENT DOCUMENTS 5,227,876 A * 7/1993 Cucchi ............... H04N 19/00
                                                                       348/484
5,631,908 A * 5/1997 Saxe .................. H04J 3/247
                                                                       370/235
(Continued)

FOREIGN PATENT DOCUMENTS

CN     101548494 A        9/2009
EP       2343656 A1 *     7/2011   ......... G06F 13/3625
(Continued)

OTHER PUBLICATIONS

International Search Report and Written Opinion issued in International Application No. PCT/CN2015/093241 filed Oct. 29, 2015.
(Continued)

*Primary Examiner* — Natasha W Cosme
(74) *Attorney, Agent, or Firm* — Norton Rose Fulbright Canada LLP

(57) ABSTRACT

There is disclosed a network communication system that includes data sources and of switches. Each of the data sources and switches is interconnected by a packet-switched network, and is synchronized to a common clock. The system also includes a network controller that maintains records of network characteristics including a transmission delay for each of the data sources and switches, and a transmission delay for links in the packet-switched network. The network controller processes the network characteristics to generate, for each of a plurality of packets of a given type of traffic: a path from a particular data source, and through at least one particular switch, and a schedule of departure times at each of the particular data source and the at least one particular switch. The path and the schedule are optimized to meet jitter requirements for the given type of traffic.

22 Claims, 7 Drawing Sheets

(51) Int. Cl.
*H04L 12/26* (2006.01)
*H04L 12/875* (2013.01)
*H04L 12/707* (2013.01)
*H04L 12/727* (2013.01)
*H04L 12/751* (2013.01)
*H04L 12/24* (2006.01)

(52) U.S. Cl.
CPC ............. *H04L 47/56* (2013.01); *H04W 56/00* (2013.01); *H04L 41/5019* (2013.01); *H04L 45/02* (2013.01); *H04L 45/121* (2013.01); *H04L 45/24* (2013.01)

(58) Field of Classification Search
CPC ............... H04W 28/0236; H04W 4/06; H04W 28/0268; H04W 28/0278; H04W 52/02; H04W 52/0206; H04W 52/0209; H04W 52/0229; H04W 52/0235; H04W 52/143; H04W 52/243; H04W 72/04
USPC .......................................................... 370/350
See application file for complete search history.

(56) References Cited

U.S. PATENT DOCUMENTS

| | | | |
|---|---|---|---|
| 6,385,198 | B1 | 5/2002 | Ofek et al. |
| 8,477,616 | B1 | 7/2013 | Rogers et al. |
| 2001/0036181 | A1 | 11/2001 | Rogers |
| 2002/0191592 | A1* | 12/2002 | Rogers ................... H04L 45/10 370/352 |
| 2003/0048782 | A1 | 3/2003 | Rogers et al. |
| 2004/0042402 | A1* | 3/2004 | Galand ..................... H04L 1/22 370/237 |
| 2004/0047293 | A1* | 3/2004 | Arrakoski ............. H04L 12/417 370/236 |
| 2008/0089364 | A1 | 4/2008 | Barry et al. |
| 2008/0219145 | A1* | 9/2008 | Sundaresan ........... H04L 47/283 370/203 |
| 2011/0002429 | A1* | 1/2011 | Williams ............... H04J 3/0638 375/356 |
| 2014/0169264 | A1 | 6/2014 | Katori |
| 2014/0269288 | A1 | 9/2014 | Crisan et al. |

FOREIGN PATENT DOCUMENTS

| | | |
|---|---|---|
| JP | H07183864 A | 7/1995 |
| JP | H0993644 A | 4/1997 |
| JP | 2003518817 A | 6/2003 |
| JP | 2007251627 A | 9/2007 |
| WO | 2014037061 | 3/2014 |

OTHER PUBLICATIONS

JDSU, White Paper, Cloud-RAN Deployment with CPRI Fronthaul Technology, dated Dec. 2013.

\* cited by examiner

SYSTEMS, DEVICES, AND METHODS FOR LOW-JITTER COMMUNICATION OVER A PACKET-SWITCHED NETWORK

CROSS REFERENCE TO RELATED APPLICATIONS

This application claims priority to U.S. Provisional Patent Application No. 62/073,132 entitled "Systems and Methods for CPRI Communication over a Packet-Switched Network" filed Oct. 31, 2014 and to U.S. Patent Application No. 62/130,901 entitled "Optimization for Scheduling Low Traffic Jitter on a Packet Network" filed Mar. 10, 2015. Both of these related applications are hereby incorporated by reference in their entireties.

FIELD

This disclosure relates to network communications, and more particularly, to systems, devices, and methods for low-jitter communication over a packet-switched network.

BACKGROUND

Optical links are used for network communications requiring low packet jitter. For example, optical links are used in front-haul networks of wireless communication systems.

In a wireless communication system, a radio access network connects a mobile device (e.g. a User Equipment (UE) or other such device) to a core network. Different generations of wireless networks use different architectures for their core networks (e.g. the Packet Core (PC) network and the Evolved Packet Core (EPC) network as specified by the 3$^{rd}$ Generation Partnership Project (3GPP)). Examples of radio access networks include Global System for Mobile Communications (GSM) networks, Universal Mobile Telecommunications System (UMTS) networks, 4G Long-Term Evolution networks, and the like. A radio access network serves a geographical region and provides radio access to mobile devices through radio base stations. Examples of a radio base station include a base transceiver station (BTS), a Node B, and an Evolved Node B (eNB). A radio base station communicates with equipment mobile device within its service area by way of an air interface, and provides access to the core networks. Those skilled in the art will appreciate that in referring to a mobile device, it should be understood that the mobile device is a device that connects to a mobile network, such as a wireless network, regardless of whether the device itself is mobile.

A radio base station may have a distributed architecture. For example, a radio base station may be divided into a radio equipment controller and one or more radio equipment (also referred to as a remote radio head (RRH)). The radio equipment controller may communicate with one or more radio equipment, e.g., messages for controlling antenna transmissions at the radio equipment, by way of an interface internal to the radio base station. An example of such an internal interface is the Common Public Radio Interface (CPRI), as defined in CPRI Specification V6.0. Such an internal interface allows radio equipment and a radio equipment controller to be located remotely from one another. For example, the radio equipment may be located at an antenna site, while the radio equipment controller may be located in a data centre.

Communication by way of a CPRI interface has tight bounds on jitter, which may be satisfied by an optical link. However, such optical links may be expensive, and are not always available. There has been work on the use of CPRI over an Ethernet connection (CPRI-over-Ethernet), but much of this work has been focussed on the use of a dedicated Ethernet connection between the controller and an RRH. To ensure that the tight bounds on jitter and high speeds required for CPRI are met, the dedicated Ethernet connections are effectively treated as direct connections.

Accordingly, there exists a need for improved systems, devices, and methods for low-jitter communication, or at least alternatives.

SUMMARY

In accordance with an aspect, there is provided a network communication system. The system includes a plurality of data sources and a plurality of switches. Each of the data sources and the switches is interconnected by a packet-switched network, and synchronized to a common clock. The system also includes a network controller configured to maintain records of network characteristics comprising: a transmission delay for each of the data sources and the switches, and a transmission delay for each of a plurality of links in the packet-switched network; and to process the network characteristics to generate, for each of a plurality of packets of a given type of traffic: a path from a particular data source of the plurality of data sources, and through at least one particular switch of the plurality of switches, and a schedule of departure times at each of the particular data source and the at least one particular switch. The path and the schedule are optimized to meet jitter requirements for the given type of traffic.

In accordance with another aspect, there is provided a method of controlling a packet-switched network. The method includes maintaining records of network characteristics comprising: a transmission delay for each of a plurality of data sources and a plurality of switches interconnected by a packet-switched network, and a transmission delay for each of a plurality of links in the packet-switched network. The method also includes processing the network characteristics to generate, for each of a plurality of packets of a given type of traffic: a path from a particular data source of the plurality of data sources, and through at least one particular switch of the plurality of switches, and a schedule of departure times at each of the particular data source and the at least one particular switch. The path and the schedule are optimized to meet jitter requirements for the given type of traffic.

In accordance with yet another aspect, there is provided a device for controlling a packet-switched network. The device includes memory storing network characteristics comprising: a transmission delay for each of a plurality of data sources and a plurality of switches interconnected by a packet-switched network, and a transmission delay for each of a plurality of links in the packet-switched network. The device also includes at least one processor in communication with the memory. The processor is configured to: process the network characteristics to generate, for each of a plurality of packets of a given type of traffic: a path from a particular data source of the plurality of data sources, and through at least one particular switch of the plurality of switches, and a schedule of departure times at each of the particular data source and the at least one particular switch; wherein the path and the schedule are optimized to meet jitter requirements for the given type of traffic.

DESCRIPTION OF THE FIGURES

In the figures.

These drawings depict example embodiments for illustrative purposes, and variations, alternative configurations, alternative components and modifications may be made to these example embodiments.

DETAILED DESCRIPTION

Figure 1:
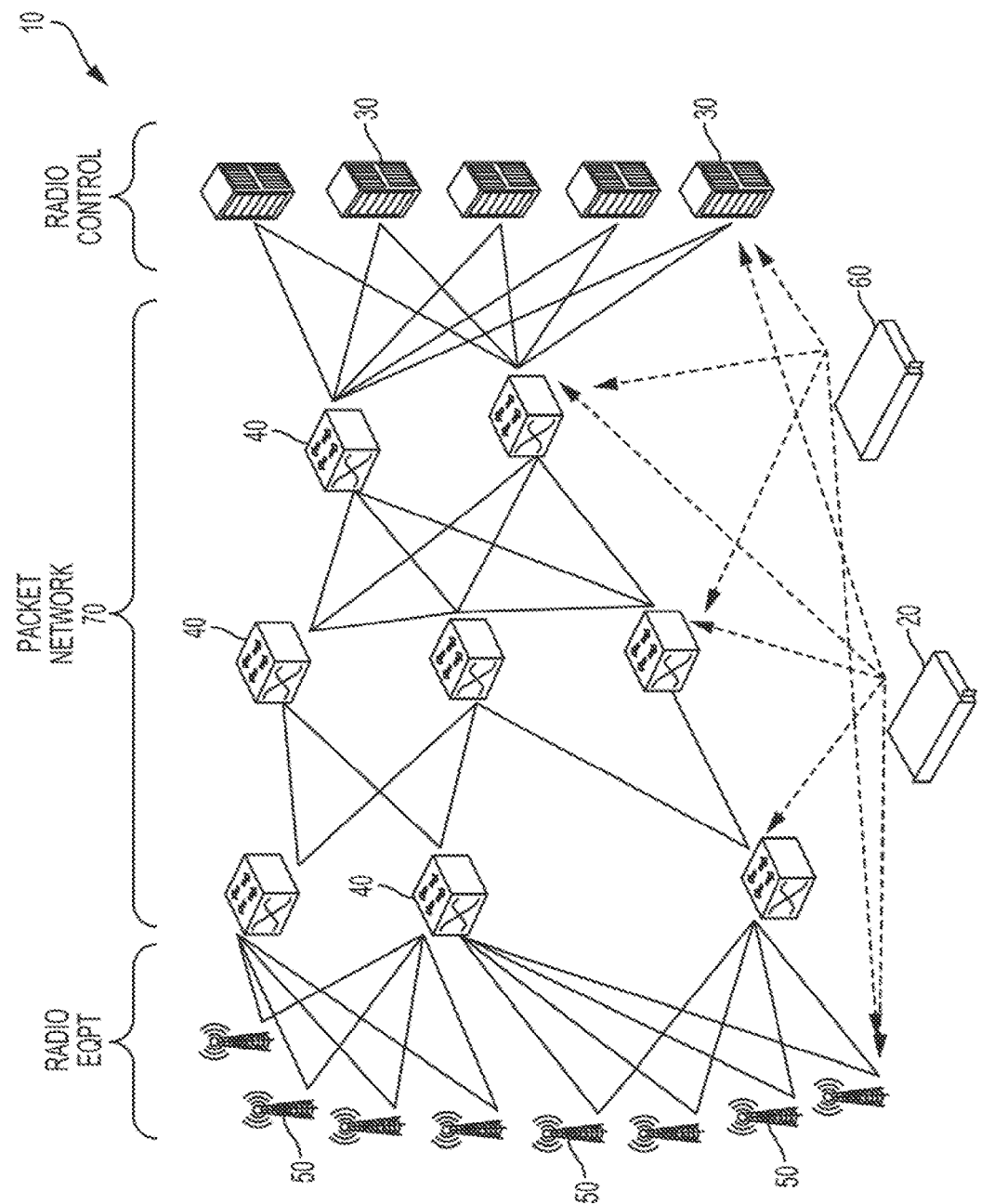
FIG. 1 is a network diagram of a network communication system, in accordance with an embodiment.

FIG. 1 illustrates a network communication system 10, in accordance with an embodiment. As depicted, system 10 includes a network controller 20, data sources 30, switches 40, data sinks 50, and a clock controller 60, interconnected by a packet-switched network 70.

Network controller 20 is a software-defined network (SDN) controller and performs control plane functions for packet-switched network 70. Network controller 20 may, e.g., be an OpenDaylight SDN controller, an Open Network Operating System (ONOS) SDN controller, or the like. In another embodiment, network controller 20 may be a non-SDN network controller.

Network controller 20 performs traffic engineering functions for network 70. For example, network controller 20 determines paths for packets transmitted in a network 70, and schedules departure times of packets at nodes of system 10, e.g., at data sources 30 and switches 40 such that jitter for transmission of packets over network 70 is minimized. Network controller 20 may also determine paths and schedules such that delay for transmission of packets over network 70 is minimized.

Network controller 20 may communicate with nodes of system 10, e.g., data sources 30 and switches 40 according to the OpenFlow™ protocol.

Network controller 20 may also perform various other control plane functions, including network configuration, network monitoring, etc., for network 70.

In the depicted embodiment, system 10 is configured for CPRI communication. Accordingly, each data source 30 is a radio equipment controller, and may be referred to as a radio equipment controller 30, and each data sink 50 is a radio equipment and may be referred to as a radio equipment 50. Radio Equipment 50 may, in some embodiments, be a Remote Radio head Each radio equipment controller 30 communicates with at least one associated radio equipment 50 using CPRI over packet-switched network 70 in manners detailed herein. A radio equipment controller 30 and an associated radio equipment 50 operate in concert to provide a radio base station for serving a part of a radio access network.

In the depicted embodiment, network 70 is an Ethernet network including a plurality of wired links. However, in another embodiment, network 70 may use other link types, both wired and wireless. It should be understood that the type of links selected must meet throughput, timing and latency requirements specific to the specific applications that the network is used for. In embodiments where the network is used for CPRI traffic wired networks using Ethernet links may be appropriate, as would wireless links using advanced point to point wireless technologies such as millimeter wave wireless radios.

Figure 2:
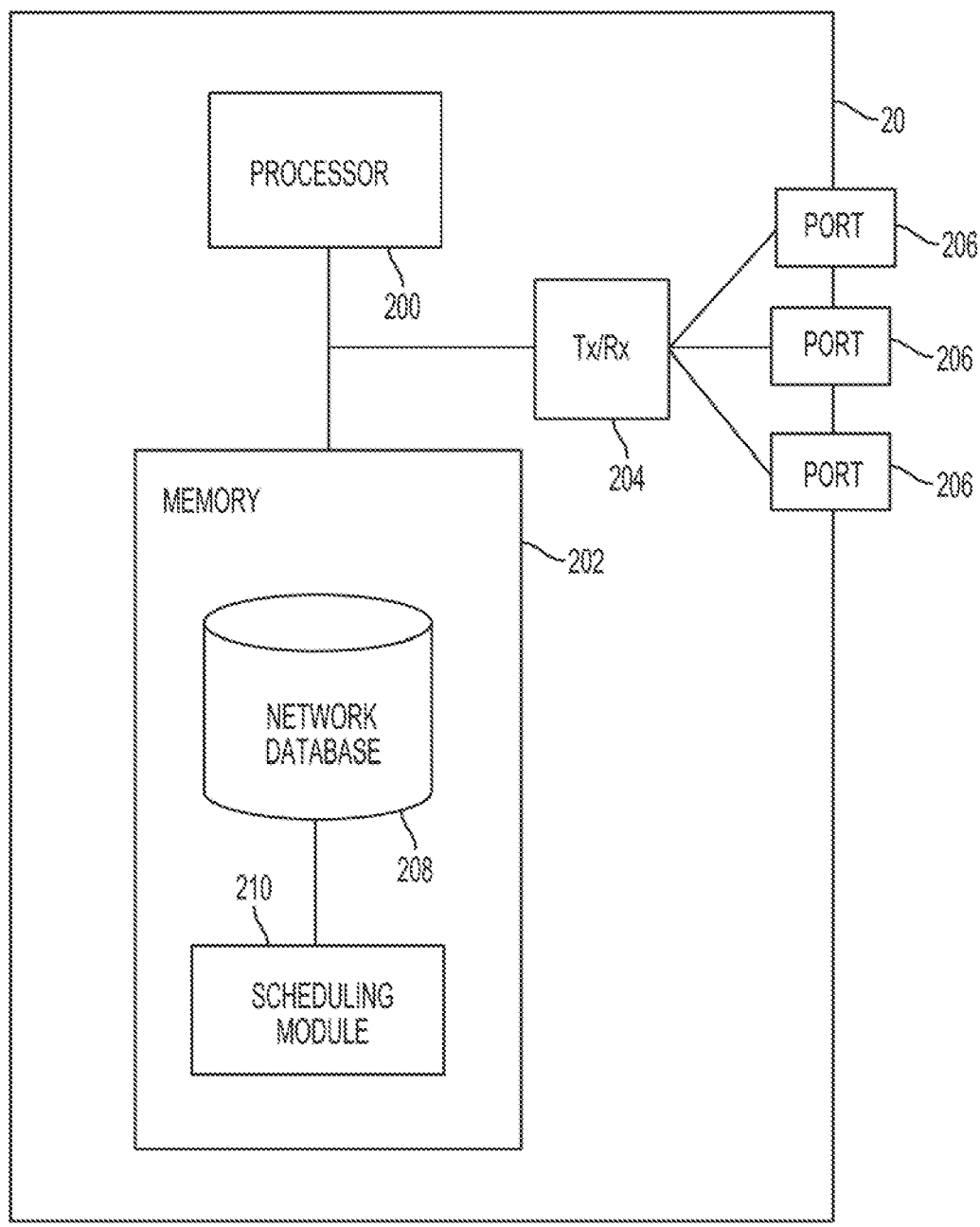
FIG. 2 is a high-level schematic diagram of a network controller of the network communication system of FIG. 1, in accordance with an embodiment.

FIG. 2 is a high-level schematic diagram of network controller 20, in accordance with an embodiment. As shown, network controller 20 includes a processor 200, memory 202, transceiver units (Tx/Rx) 204, and ports 206.

Processor 200 may be implemented by hardware and software. For example, processor 200 may be implemented as one or more central processing unit (CPU) chips, logic units, cores (e.g., as a multi-core processor), field-programmable gate arrays (FPGAs), application specific integrated circuits (ASICs), and digital signal processors (DSPs). Processor 200 is in communication with memory 202, Tx/Rx 204, and ports 206. Ports 206 are coupled to Tx/Rx 204, which may be transmitters, receivers, or combinations thereof. Tx/Rx 204 may transmit and receive data via ports 206.

Memory 202 may include volatile or non-volatile memory. Memory 202 may include read-only memory (ROM), random-access memory (RAM), ternary content-addressable memory (TCAM), and static random-access memory (SRAM). Memory 202 may also include one or more of disks, tape drives, and solid-state drives.

Memory 202 may store instructions and data that are read during program execution, e.g., at processor 200 for implementing embodiments described herein.

In particular, memory 202 stores instructions and data for a network database 208 and a scheduling module 210.

Network database 208 is populated with data relating to the topology and operating characteristics of network 70. For example, network database 208 may include records identifying each node (e.g., data sources 30, switches 40, and data sinks 50), and identifying each link interconnecting the nodes; records reflecting the operating characteristics of each link (e.g., data rate, time-of-flight or transmission delay on link, etc.); and records reflecting the operating characteristics of each node (e.g., data rate of each data source 30, inbound port to outbound port transmission delay through each switch 40, throughput of each switch 40, etc.).

At least some of the data stored in network database 208 may be measured prior to operation of network controller 20. Network database 208 may be updated as the topology and operating characteristics of network 70 change, e.g., as new nodes or links are added or upgraded, or as nodes or links are removed or fail. Updates regarding changing network conditions may be received from the nodes, or from dedicated monitors (not shown) connected to network 70. In an embodiment, network database 200 may be updated in real-time or near real-time.

Scheduling module 210 is configured to generate a path for packets transmitted in network 70, e.g., from a given data source 30 to a given data sink 50, and through one or more switches 40.

Scheduling module 210 may also be configured to generate a schedule of departure times of packets at the given data source 30 and each switch 40 in the path. This schedule may also identify a particular queue or port to be used at each data source 30 or switch 40.

Scheduling module 210 generates the path and the schedule by processing records of database 208 to take into account the topology and operating characteristics of network 70 noted above including, e.g., the transmission delay at each node and through each link. By taking into account such network characteristics, the paths and schedules are optimized to minimize end-to-end jitter and/or end-to-end delay of each packet transmitted through network 70.

For example, for each particular packet, transmission from an outbound queue of a data source 30 or switch 40 may be scheduled for departure in a particular time slot. The particular time slot may be selected such that when the packet traverses the link to its destination node, e.g., a given switch 40, its arrival time does not coincide with the arrival time of another packet contending for the same transmission resources at the given switch 40. In this way, jitter and delay resulting from contention for transmission resources by multiple arriving packets at a switch 40 may be avoided or minimized.

Similarly, the particular time slot may be selected such that when the packet arrives at the given switch 40, it may be forwarded by the given switch 40 immediately in a time slot scheduled for the packet. Delay associated with waiting for an available time slot to forward the packet may thereby be avoided or minimized.

For each packet, by scheduling time slots at each successive node in a path connecting a given data source 30 and a given data sink 50, the packet may traverse the entire path in the scheduled time slots such that end-to-end jitter and/or end-to-end delay may be avoided or minimized. So, for example, packets for CPRI traffic may be transmitted through network 70 with delay and jitter that meet CPRI requirements.

In an embodiment, scheduling module 210 may be configured to select a time slot size in a schedule of departure times such that a time slot is available when a node (e.g., a data source 30 or a switch 40) has a packet to transmit.

Selection of a time slot size may be described with reference to parameters $\alpha$, $\beta$, and $\phi$.

Parameter $\alpha$ is reflective of the basic time granularity available in a network for scheduling transmissions. As will be appreciated, the value of $\alpha$ is dependent on the physical network hardware. In a packet-switched network such as network 70, $\alpha$ may correspond to the time required by the highest speed link to transmit a packet.

Parameter $\beta$ is reflective of the number time slots in a time window in which the traffic flows are to be scheduled across network 70. Parameter $\beta$ may also be referred to as the transmission cycle since scheduling is performed for one cycle, and assuming constant bit rate data sources, the schedule may be applied to subsequent cycles.

Parameter $\phi$ is reflective of the basic granularity for quantifying link capacities and traffic flow rates as integers. More particularly, parameter $\phi$ is the amount of data transmitted by one time slot $\alpha$ within a transmission cycle $\beta$.

Parameter $\phi$ may be determined as the greatest common divisor (gcd) of the capacities of all link types and the flow rates of all traffic in a network. The selection of parameter $\phi$ may be further explained with reference to the following example for transmission of CPRI traffic in network 70. In this example, there are three possible flow rates: 2.4576 Gbps, 4.9152 Gbps, and 9.8304 Gbps (e.g., corresponding to transmission rates at radio equipment controllers 30), which may be approximated as 2.5 Gbps, 5 Gbps, and 10 Gbps, respectively. In this example, there are also three possible link capacities: 10 Gbps, 40 Gbps, and 100 Gbps. Parameter $\phi$, the gcd of these flow rates and link capacities, is therefore 2.5 Gbps. The flow rates and link capacities may be represented as integer multiples of $\phi$ as follows: {1, 2, 4, 4, 16, 40}.

Parameter $\beta$ may then be selected as the least common multiple (lcm) of the flow rates and link capacities in units of CP as follows:

$$\beta = \text{lcm of } \{1,2,4,4,16,40\} = 80.$$

The frequency at which packets may be transmitted in each transmission cycle varies depending on the flow rate. In the above example, as $\phi=2.5$ Gbps and $\beta=80$, a flow rate of 2.5 Gbps maps to one time slot in each transmission cycle such that a packet may be transmitted once per 80 time slots; a flow rate of 5 Gbps maps to two time slots such that a packet is transmitted twice per 80 time slots, and a flow rate of 10 Gbps maps to four time slots such that a packet is transmitted four times per 80 time slots.

Figure 3:
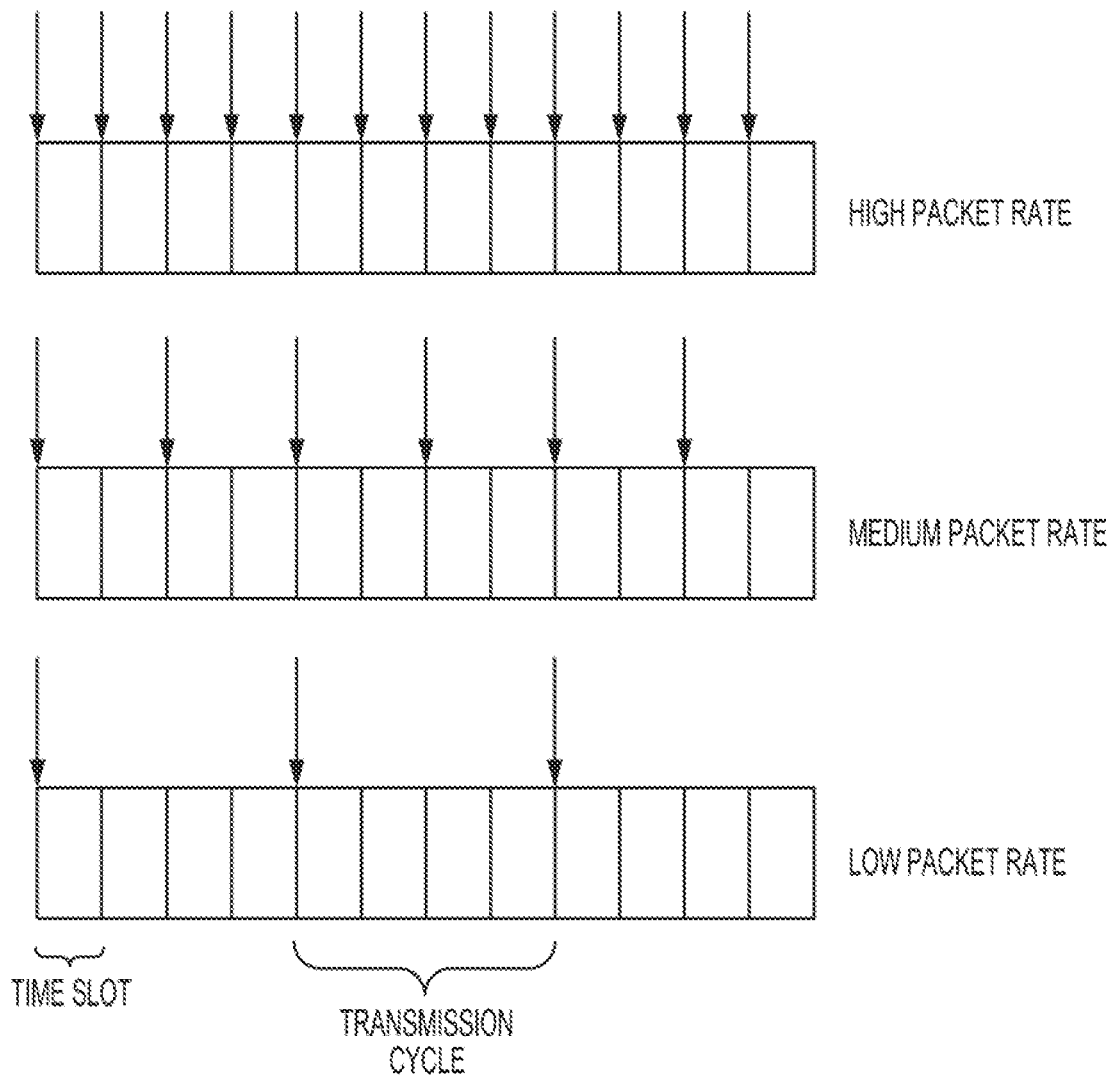
FIG. 3 is a schematic diagram showing transmission of packets, in time slots according to packet rate, in the network communication system of FIG. 1, in accordance with an embodiment.

FIG. 3 illustrates the variation in the flow rate with reference to a simplified example. In this simplified example, the CPRI flow rates are 614.4 Mbps, 1228.8 Mbps, and 2457.6 Mbps. Assuming link capacities that are integer multiples of the lowest flow rate 614.4 Mbps, the number of time slots in a transmission cycle is four (i.e., $\beta=4$). As shown in FIG. 3, for this simplified example, given a flow rate of 614.4 Mbps, a packet is transmitted every four time slots (low packet rate); given a flow rate of 1228.8 Mbps, a packet is transmitted every two time slots (medium packet rate); and given a flow rate of 2457.6 Mbps, a packet is transmitted every time slot (high packet rate).

In an embodiment in which network 70 is an Ethernet network, the size of the time slot corresponds to the size of an Ethernet packet.

In an embodiment, scheduling module 210 may be configured to select a time slot size to accommodate overhead associated with frame pre-emption, e.g., pre-emption in accordance with IEEE P802.1Qbu/D1-1. In an embodiment, scheduling module 210 may be configured to select a time slot size to accommodate packet overhead, e.g., for Ethernet and/or IP packet headers. In an embodiment, scheduling module 210 may be configured to select a time slot size to accommodate clock drift between nodes in network 70.

In an embodiment, scheduling module 210 may be configured to re-select a time slot size when the topology and/or operating characteristics of network 70 change, e.g., when a link capacity changes or when a flow rate changes. Accordingly, the size of time slots may adapt dynamically to changing network conditions.

In an embodiment, packet sizes in network 70 may be selected to facilitate the selection of a time slot size. For example, a packet size may be selected to provide a desirable number of packets per second for each flow type on the slowest link in network 70, where desirable numbers include integers and rational numbers that may be expressed as simple fractions.

In an embodiment, one or both of a packet size and a slot size may be selected while ensuring that the slot size is greater than the packet size.

Network controller 20 transmits at least a part of the generated route and schedule to each of data sources 30 and switches 40 for implementation in transmission of packets. As detailed below, each of data sources 30 and switches 40 may be synchronized to a common clock allowing the transmission schedules to be implemented precisely and accurately.

Network controller 20 may generate or update a route or schedule in response to changing network topology or changing operating characteristics, as may be notified to network controller 20. For example, in an embodiment, network controller 20 may generate or update a schedule or route when links or nodes are added or removed, or when data rates of data sources 30 change. Network controller 20 may also generate or update a schedule or route at a pre-defined interval.

In an embodiment, network controller 20 may generate and transmit route and schedule data in accordance with IEEE 802.1Qbv/D2.1, "Enhancements for Scheduled Traffic".

In an embodiment, scheduling module 210 may generate schedules that provide margin (often referred to as slop) to provide tolerance for any deviation for the schedule, e.g., resulting from clock errors at data sources 30 or switches 40.

Figure 4:
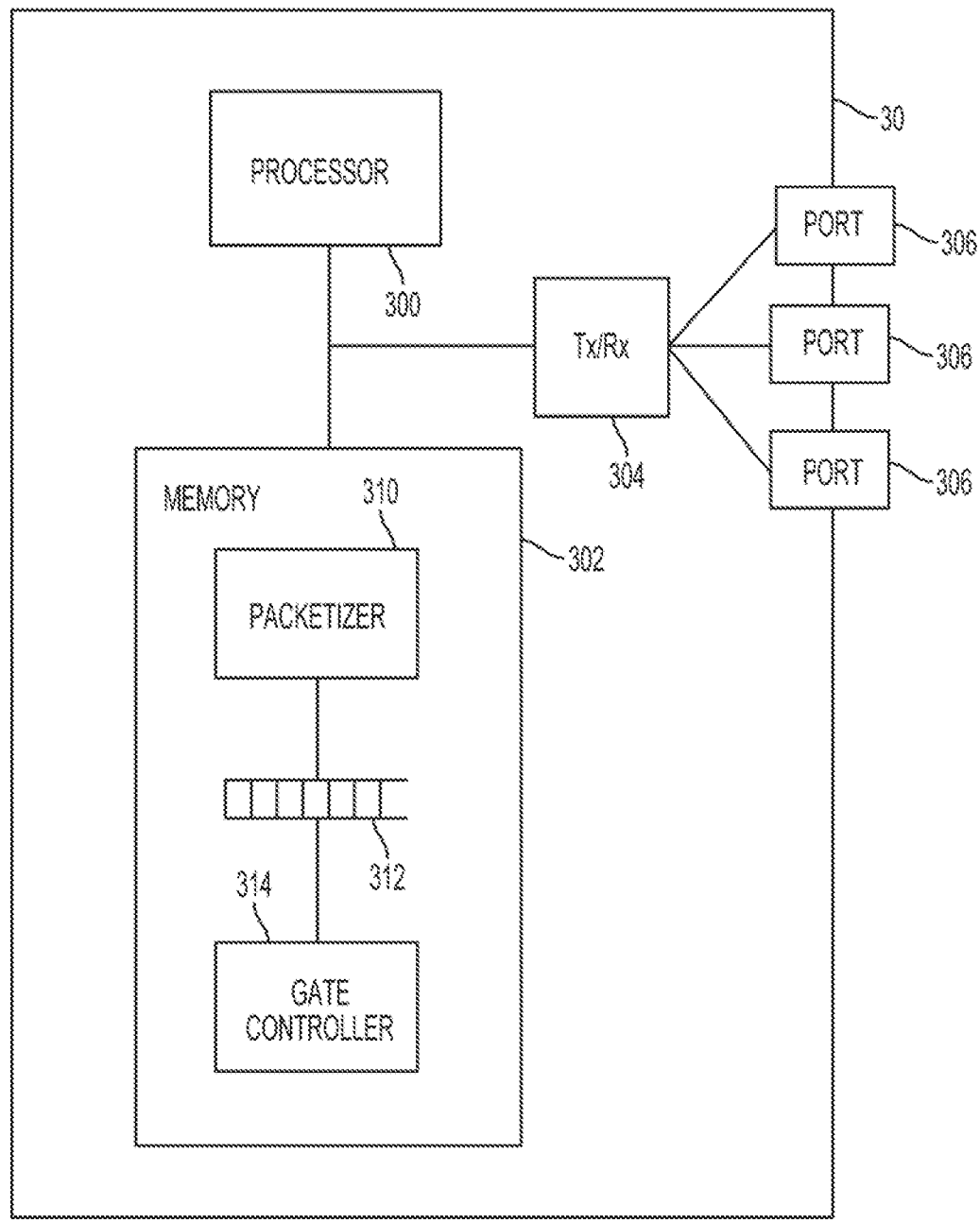
FIG. 4 is a high-level schematic diagram of a data source of the network communication system of FIG. 1, in accordance with an embodiment.

FIG. 4 is a high-level schematic diagram of a data source 30, in accordance with an embodiment. As shown, data source 30 includes a processor 300, memory 302, Tx/Rx 304, and ports 306. Memory 302 stores instructions and data for a packetizer 310, an outbound queue 312, and a gate controller 314. Although only one outbound queue 312 is illustrated, there may be multiple queues 312, e.g., each associated with a particular port 306.

Packetizer 310 is configured to generate a plurality of packets from a data stream. In an embodiment, packetizer 310 may be configured to generate packets having a packet size selected in manners described above. Once generated, the packets are provided to outbound queue 312 for transmission through network 70, by way of a Tx/Rx 304 and a port 306.

In the depicted embodiment, each data source 30 is a constant bitrate source. In another embodiment, one or more of data sources 30 may be variable bitrate sources. As noted, data source 30 may be a CPRI radio equipment controller.

Each packet is transmitted from outbound queue 312 at data source 30 to a destination node selected by network controller 20, at the precise time scheduled by network controller 20. Each packet may be transmitted from outbound queue 312 through a port 306 selected by network controller 20 or data source 30.

Queue 312 is gated such that packets are transmitted only when the queue's gate is activated, under control of gate controller 314. Gate controller 314 may be configured to perform gate control in accordance with IEEE 802.1Qbv/D2.1.

Gate controller 314 receives at least a portion of the schedule generated at network controller 20 and processes the schedule to determine the particular time slots that particular packets are scheduled for departure. Gate controller 314 activates queue 312 for transmission of each particular packet at the scheduled time for that packet.

Transmission of packets from data source 30 uses a clock that is synchronized with other data sources 30 and switches 40, in manners detailed below.

Processor 300, memory 302, Tx/Rx 304, and ports 306 are configured and interconnected in manners substantially similar to those described for processor 200, memory 202, Tx/Rx 204, and ports 206.

Figure 5:
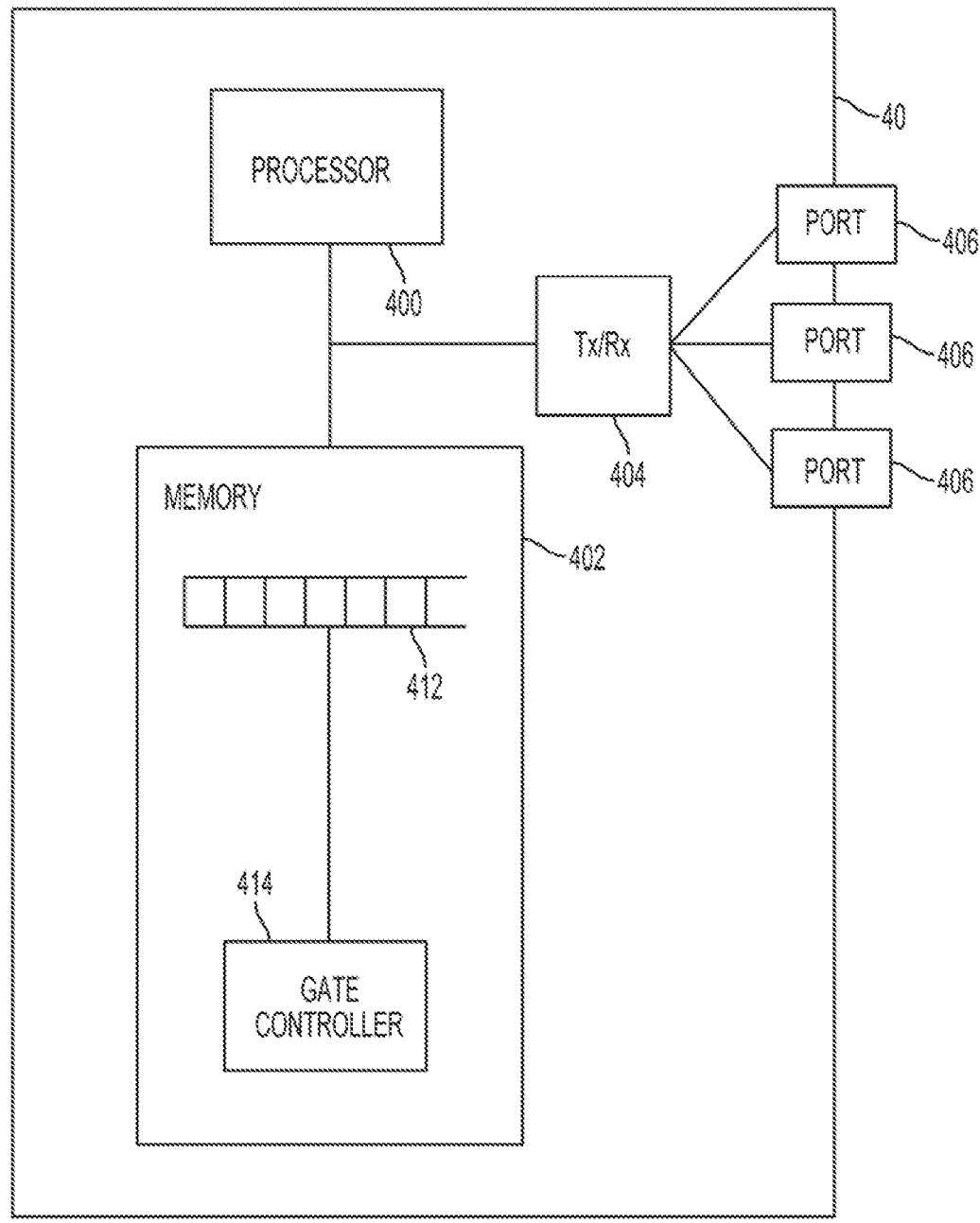
FIG. 5 is a high-level schematic diagram of a switch of the network communication system of FIG. 1, in accordance with an embodiment.

FIG. 5 is a high-level schematic diagram of a switch 40, in accordance with an embodiment. As shown, switch 40 includes a processor 400, memory 402, Tx/Rx 404, and ports 406. Memory 402 stores instructions and data for an outbound queue 412 and a gate controller 414. Although only one outbound queue 412 is illustrated, there may be multiple queues 412, e.g., each associated with a particular port 406.

Switch 40 performs packet switching under the control of network controller 20. Packets received at switch 40 (e.g., from a data source 30 or another switch 40) are placed in an outbound queue 412 for transmission.

Each packet is transmitted from outbound queue 412 at switch 40 to a destination node selected by network controller 20, at the precise time scheduled by network controller 20.

Each packet may be transmitted from outbound queue 412 through a port 406 selected by network controller 20 or switch 40.

Queue 412 is gated such that packets are transmitted only when the queue's gate is activated, under control of gate controller 414. Gate controller 414 may be configured to perform gate control in accordance with IEEE 802.1Qbv/D2.1.

Gate controller 414 receives at least a portion of the schedule generated at network controller 20 and processes the schedule to determine the particular time slots that particular packets are scheduled for departure. Gate controller 414 activates queue 412 for transmission of each particular packet at the scheduled time for that packet.

Transmission of packets from switch 40 uses a clock that is synchronized with other switches 40 and data sources 30, in manners detailed below.

Switch 40 may include additional outbound queues, each for transmitting a particular type/class. For example, switch 40 may include a queue for transmitting CPRI traffic and additional queues for transmitting other types of traffic. Transmission of packets from any such additional outbound queues may also be controlled by network controller 20.

Processor 400, memory 402, Tx/Rx 404, and ports 406 are configured and interconnected in manners substantially similar to those described for processor 200, memory 202, Tx/Rx 204, and ports 206.

Packets transmitted over network 70 arrive at data sink 50 (FIG. 1). Each data sink 50 receives data packets sent by an associated data source 30. Each data sink 50 de-packetizes the received data to form a data stream. As noted, each data sink 50 may be a CPRI radio equipment. Accordingly, the data packets received at data sink 50 may contain CPRI data, which may be processed at data sink 50 to control antennas at the radio equipment.

System 10 implements clock synchronization to synchronize the clocks (i.e., time and frequency) of each data source 30 and switch 40 to a common clock.

In the depicted embodiment, system 10 implements clock synchronization according to the Precision Time Protocol (PTP), as defined in the IEEE 1588-2008 standard, "IEEE Standard for a Precision Clock Synchronization Protocol for Networked Measurement and Control Systems". So, as depicted, system 10 includes a clock controller 60 adapted to operate as a PTP grandmaster, to establish a precise and accurate clock against which other clocks in system 10 may be synchronized.

Clock controller 60 transmits clock synchronization messages over network 70 to interconnected nodes, e.g., data sources 30 and switches 40. Some or all of the data sources 30 and switches 40 may be adapted to operate as a PTP master, which further propagates clock synchronization messages to interconnected nodes. Clock synchronization messages may be propagated over network 70 according to a protocol defined in the IEEE 802.1AS-2011 standard, "IEEE Standard for Local and Metropolitan Area Networks-Timing and Synchronization for Time-Sensitive Applications in Bridged Local Area Networks".

In this way, each of clock controller 20, data sources 30, and switches 40 are brought under a common PTP timing domain. This allows each of data sources 30 and switches 40 to adhere, precisely and accurately, to the schedules generated by network controller 20 when transmitting packets. In an embodiment, network controller 20 may also be brought under this timing domain and be synchronized to the common clock.

While illustrated as separate devices in FIG. 1, in some embodiments, the network controller 20 may include or may otherwise be configured to perform the functions of a clock controller 60.

In another embodiment, system 10 may perform clock synchronization according to one or more other protocols such as, e.g., Network Time Protocol (NTP) or a Global Positioning System (GPS) time synchronization protocol. Components of system 10, including, e.g., clock controller 60, data sources 30, and switches 40 may be adapted implement one or more such other protocols. Transmission of clock synchronization messages within system 10 may adhere to a protocol other than that defined in IEEE 802.1AS-2011.

When system 10 implements a clock synchronization protocol that does not require a network-interconnected clock controller, e.g., when data source 30 and switches 40 synchronize their clocks with a satellite source, clock controller 60 may be omitted.

The particular time synchronization protocol or protocols implemented by system 10 may be chosen based on the required clock accuracy and precision, which may in turn depend on the type of traffic transmitted in system 10.

In an embodiment, network 70 may be used to transmit disparate types of traffic, e.g., CPRI traffic and one or more other types of traffic. Such other types of traffic may include, e.g., traffic associated with PTP synchronization messages, and traffic associated with user data. In this embodiment, network controller 20 may be configured to schedule transmission of packets of such disparate types of traffic.

When the disparate types of traffic include a higher priority type of traffic (e.g., CPRI data) and a lower priority type of traffic (e.g., user data), network controller 20 may schedule packets for higher priority traffic for transmission out-of-order and ahead of packets for lower priority traffic.

In an embodiment, nodes of system 10, e.g., such as data sources 30 and switches 40 may implement a pre-emption mechanism allowing transmission of packets for higher priority traffic to interrupt transmission of packets for lower priority traffic. For example, the pre-emption mechanism may be as defined in the IEEE P802.1Qbu/D1-1, "Frame Pre-emption".

The operation of system 10 is further described with reference to FIG. 6 and example blocks 602 through 610.

At block 602, network controller 20 maintains records storing data relating network characteristics, e.g., topology and operating characteristics for network 70. These characteristics may include a transmission delay for each data source 30 and each switch 40. These characteristics may also include a transmission delay for each link of network 70. At block 604, network controller 20 processes these characteristics to generate, for each packet, a path from the packet's data source 30 through at least one switches 40, to a data sink 50, and a schedule of departure times at the data source 30 and at the switches 40 in the path. As detailed above, the path and schedule are optimized to meet delay and/or jitter requirements for a given type of traffic.

At block 606, network controller 20 provides the path and schedule to the data sources 30 and switches 40, e.g., by transmitting control messages reflecting the path and schedule to the data sources 30 and switches 40.

At block 608, the clocks at data sources 30 and switches 40 are synchronized to a common clock in manners detailed herein.

At block 610, the data sources 30 and switches 40 implement the path and schedule generated by network controller 20 to transmit the packets through network 70.

Figure 6:
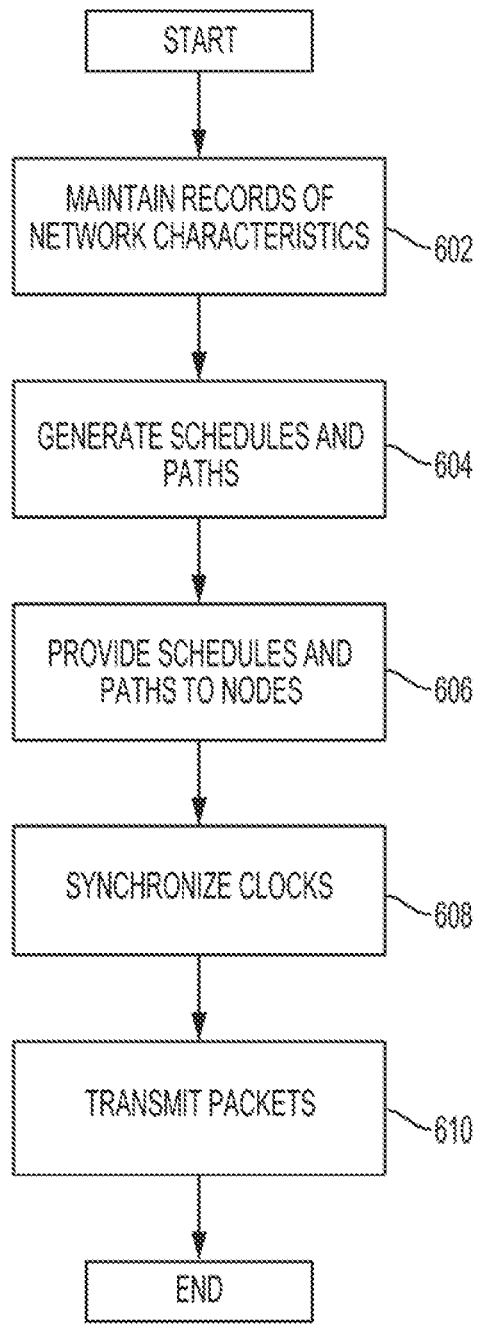
FIG. 6 is a flowchart showing operation of the network communication system, in accordance with an embodiment.

The order of blocks shown in FIG. 6 is provided as an example only. The blocks may be performed in other orders. Some blocks may be performed concurrently with other blocks.

Figure 7:
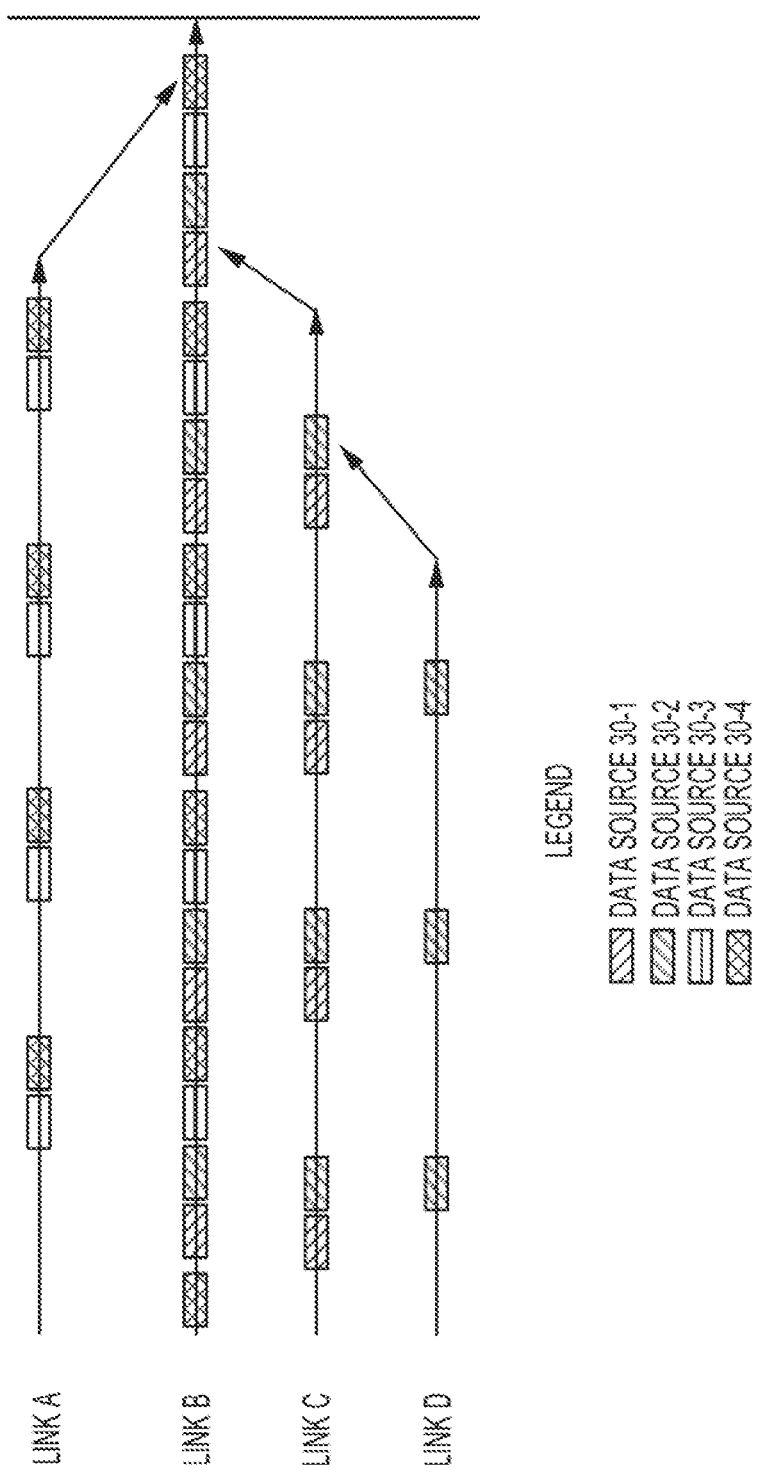
FIG. 7 is a schematic diagram showing an example flow of packets in the network of FIG. 1.

FIG. 7 schematically illustrates an example flow of packets in network 70. As shown, packets from four data sources (i.e., data sources 30-1, 30-2, 30-3, and 30-4) travel initially along low bitrate links and are amalgamated at switches 40 onto other links, which may have progressively higher bitrates.

For example, as shown, packets from data source 30-2 travel along link D, and merge with packets from data source 30-1 at a switch 40, and packets from data source 30-1 and 30-2 are transmitted from that switch 40 to travel along a link C. Further, as shown, packets from data sources 30-3 and 30-4 travel along a link A, and merge onto the link with packets from 30-3 and 30-4 at another switch 40. Packets from all of these data sources are transmitted from this other switch 40 to travel along link B.

Traffic from the data sources are merged at each switch 40 in such a way that contention for transmission resources at switches 40 is minimized. So, as shown, packets may be merged and forwarded at switches 40 such that jitter and delay may be avoided or minimized.

Although embodiments have been described in the foregoing with reference to routes and schedules generated at a network controller 20, routes and/or schedules may also be generated at a different network component. Further, in an embodiment, when network 70 has a static topology and operating characteristics, a route and/or schedule may be generated offline and configured to each data source 30 and each switch 40 in advance of data transmission. In such an embodiment, routes and/or schedules need not be transmitted through network 70. In such an embodiment, network controller 20 may be omitted.

Although embodiments have been described in the foregoing with reference to CPRI traffic, the methods and systems described herein may also be applied to other types of traffic requiring transmission with constraints on delay and/or jitter, each of which may be on the order of microseconds or nanoseconds. Such other types of traffic may include, e.g., other types of traffic internal to a radio base station such as Open Base Station Architecture Initiative traffic, real-time audio/video traffic, financial trading traffic, etc.

Embodiments disclosed herein may be implemented by using hardware only or by using software and a hardware platform. Based on such understandings, the technical solution may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments.

Program code is applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Numerous references will be made regarding servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of controlling a packet-switched network, the method comprising:
   maintaining records of network characteristics comprising:
     descriptions of a plurality of links connecting switches of a packet-switched network;
     a transmission delay for each of a plurality of data sources and a plurality of switches interconnected by the packet-switched network, and
     a transmission delay for each of the plurality of links in the packet-switched network; and selecting, based on the network characteristics, a time slot duration within a scheduling window for scheduling packets;

selecting, based on the network characteristics, a number of time slots within the scheduling window for scheduling packets, each of said number of time slots having said time slot duration;

processing the network characteristics to generate, for each of a plurality of packets of a given type of traffic:

a path from a particular data source of the plurality of data sources, and through at least one particular link of the plurality of links, and a schedule of departure times at each of the particular data source and at first and second switches connected by the particular link;

wherein the path and the schedule are optimized to meet jitter requirements for the given type of traffic.

2. The method of claim 1, further comprising: transmitting control messages reflecting the path and the schedule to the particular data source and the first and second switches.

3. The method of claim 1, further comprising: synchronizing clocks at the each of the plurality of data sources and the plurality of switches.

4. The method of claim 1, wherein the traffic of a given type is Common Public Radio Interface (CPRI) traffic.

5. The method of claim 1, wherein the packet-switched network is an Ethernet network.

6. The method of claim 1, wherein said selecting is based on a capacity of at least one of the plurality of links, and a transmission rate of at least one of the data sources.

7. The method of claim 1, wherein the path and the schedule are optimized to meet delay requirements for the given type of traffic.

8. A device for controlling a packet-switched network, the device comprising:

memory storing network characteristics comprising:
descriptions of a plurality of links connecting switches of the packet-switched network;
a transmission delay for each of a plurality of data sources and a plurality of switches interconnected by the packet-switched network, and
a transmission delay for each of the plurality of links in the packet-switched network; and at least one processor in communication with the memory, the processor configured to:
select, based on the network characteristics, a time slot duration within a scheduling window for scheduling packets;
select, based on the network characteristics, a number of time slots within the scheduling window for scheduling packets, each of said number of time slots having said time slot duration;
process the network characteristics to generate, for each of a plurality of packets of a given type of traffic:
a path from a particular data source of the plurality of data sources, and through at least one particular link of the plurality of links, and
a schedule of departure times at each of the particular data source and at first and second switches connected by the particular link;
wherein the path and the schedule are optimized to meet jitter requirements for the given type of traffic.

9. The device of claim 8, wherein the at least one processor is configured to transmit control messages reflecting the path and the schedule to the particular data source and the first and second switches.

10. The device of claim 8, wherein the time slot size is selected based on a capacity of at least one of the plurality of links, and a transmission rate of at least one of the data sources.

11. The device of claim 8, wherein the at least one processor is configured to generate at least one of the path and the schedule based on a constant bit rate for at least one of the plurality of data sources.

12. The device of claim 8, wherein the traffic of a given type is Common Public Radio Interface (CPRI) traffic.

13. The device of claim 8, wherein the packet-switched network is an Ethernet network.

14. The device of claim 8, wherein the path and the schedule are optimized to meet delay requirements for the given type of traffic.

15. The device of claim 8, wherein the at least one processor is configured to transmit or process clock synchronization messages for synchronizing clocks of the plurality of data sources and the plurality of switches.

16. A network communication system comprising:
a plurality of data sources and a plurality of switches;
each of the data sources and the switches interconnected by a packet-switched network, and synchronized to a common clock;
a network controller configured to:
maintain records of network characteristics comprising:
descriptions of a plurality of links connecting switches of the packet-switched network;
a transmission delay for each of the data sources and the switches, and
a transmission delay for each of the plurality of links in the packet-switched network;
select, based on the network characteristics, a time slot duration within a scheduling window for scheduling packets;
select, based on the network characteristics, a number of time slots within the scheduling window for scheduling packets, each of said number of time slots having said time slot duration;
process the network characteristics to generate, for each of a plurality of packets of a given type of traffic:
a path from a particular data source of the plurality of data sources, and through at least one particular link of the plurality of links, and
a schedule of departure times at each of the particular data source and at first and second switches connected by the particular link;
wherein the path and the schedule are optimized to meet jitter requirements for the given type of traffic.

17. The system of claim 16, wherein the network controller is configured to transmit control messages reflecting the path and the schedule to the particular data source and the first and second switches.

18. The system of claim 16, further comprising a clock controller configured to transmit clock synchronization messages indicative of the common clock to at least one of the plurality of data sources and the plurality of switches.

19. The system of claim 18, wherein the clock synchronization messages are transmitted according to the IEEE 802.1AS standard.

20. The system of claim 16, wherein the packet-switched network is an Ethernet network.

21. The system of claim 16, wherein the given type of traffic is Common Public Radio Interface (CPRI) traffic.

22. The system of claim 16, wherein the network controller is configured to select number of time slots based on a capacity of at least one of the plurality of links, and a transmission rate of at least one of the data sources.

* * * * *